US009162497B2

(12) United States Patent
Takabatake et al.

(10) Patent No.: US 9,162,497 B2
(45) Date of Patent: Oct. 20, 2015

(54) PRINTER

(71) Applicant: FUJITSU COMPONENT LIMITED, Tokyo (JP)

(72) Inventors: Yoshinari Takabatake, Tokyo (JP); Sumio Watanabe, Tokyo (JP); Yukihiro Mori, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 14/627,105

(22) Filed: Feb. 20, 2015

(65) Prior Publication Data

US 2015/0246562 A1 Sep. 3, 2015

(30) Foreign Application Priority Data

Feb. 28, 2014 (JP) ................................ 2014-039621

(51) Int. Cl.

| | |
|---|---|
| ***G01D 15/10*** | (2006.01) |
| ***B41J 11/70*** | (2006.01) |
| ***B26D 1/08*** | (2006.01) |
| ***B26D 5/02*** | (2006.01) |

(52) U.S. Cl.

CPC ................ *B41J 11/70* (2013.01); *B26D 1/085* (2013.01); *B26D 5/02* (2013.01)

(58) Field of Classification Search

CPC ........ B41J 11/70; B41J 11/006; B41J 11/663; B41J 11/706; B41J 11/68; B41J 29/02; B41J 15/042; B41J 29/13; B26D 1/085; B26D 5/08; B26D 2007/2685; B26D 1/0006; B26D 5/02; B26D 7/2614

USPC ............... 347/5, 101, 104, 157, 222; 400/621

See application file for complete search history.

(56) References Cited

U.S. PATENT DOCUMENTS

| | | | |
|---|---|---|---|
| 8,411,119 | B2 | 4/2013 | Tsuchiya et al. |
| 2010/0232092 | A1 | 9/2010 | Sakamoto |

FOREIGN PATENT DOCUMENTS

| | | |
|---|---|---|
| JP | 2010-173129 | 8/2010 |
| JP | 2010-214658 | 9/2010 |

*Primary Examiner* — An Do

(74) *Attorney, Agent, or Firm* — IPUSA, PLLC

(57) ABSTRACT

A printer includes a printer body, a lid, a cutter, a fixed blade unit, a movable blade unit, a gimbal plate, and a spring. The printer body includes a print head. The lid is connected to the printer body so as to be opened and closed relative to the printer body. The cutter cuts recording paper. The fixed blade unit is provided in the printer body and includes a fixed blade of the cutter. The movable blade unit is provided on the lid and includes a movable blade of the cutter. The gimbal plate is attached to the lid. The movable blade unit is connected to the gimbal plate. The spring intervenes between the movable blade unit and the gimbal plate. The movable blade unit is provided on the lid with the gimbal plate attached to the lid.

5 Claims, 15 Drawing Sheets

PRINTER

CROSS-REFERENCE TO RELATED APPLICATION

The present application is based upon and claims the benefit of priority of Japanese Patent Application No. 2014-039621, filed on Feb. 28, 2014, the entire contents of which are incorporated herein by reference.

BACKGROUND OF THE INVENTION

1. Field of the Invention

The present invention relates to printers.

2. Description of the Related Art

Printers that output receipts are widely used for shop registers and automated teller machines (ATMs) or cash dispensers (CDs) in banks. In such printers that output receipts, printing is performed on thermal paper that serves as recording paper or sheets with a thermal head while conveying the recording paper, and after conveying the recording paper a predetermined length, the recording paper is cut by a cutter to the predetermined length. Such a cutter includes a fixed blade and a movable blade, and the movable blade moves toward the fixed blade so as to cut the recording paper held between the fixed blade and the movable blade.

Such printers include clamshell printers. Clamshell printers include a printer body and a lid that is connected to the printer body in such a manner as to be openable and closable relative to the printer body. By closing the lid after loading a roll of recording paper into the printer body, printing is ready to be performed on the recording paper. Clamshell printers as well include a cutter for cutting the recording paper. Because the recording paper is held and cut between the fixed blade and the movable blade of the cutter, one of the fixed blade and the movable blade is provided in the printer body and the other is provided on the lid. Therefore, according to clamshell printers, by closing the lid, the fixed blade and the movable blade are placed at predetermined positions where the fixed blade and the movable blade function as a cutter, so that the recording paper is ready to be cut with the fixed blade and the movable blade.

Reference may be made to Japanese Laid-Open Patent Applications No. 2010-173129 and No. 2010-214658.

SUMMARY OF THE INVENTION

According to an aspect of the present invention, a printer includes a printer body, a lid, a cutter, a fixed blade unit, a movable blade unit, a gimbal plate, and a spring. The printer body includes a print head. The lid is connected to the printer body so as to be opened and closed relative to the printer body. The cutter cuts recording paper. The fixed blade unit is provided in the printer body and includes a fixed blade of the cutter. The movable blade unit is provided on the lid and includes a movable blade of the cutter. The gimbal plate is attached to the lid. The movable blade unit is connected to the gimbal plate. The spring intervenes between the movable blade unit and the gimbal plate. The movable blade unit is provided on the lid with the gimbal plate attached to the lid.

DESCRIPTION OF THE EMBODIMENTS

Figure 1:
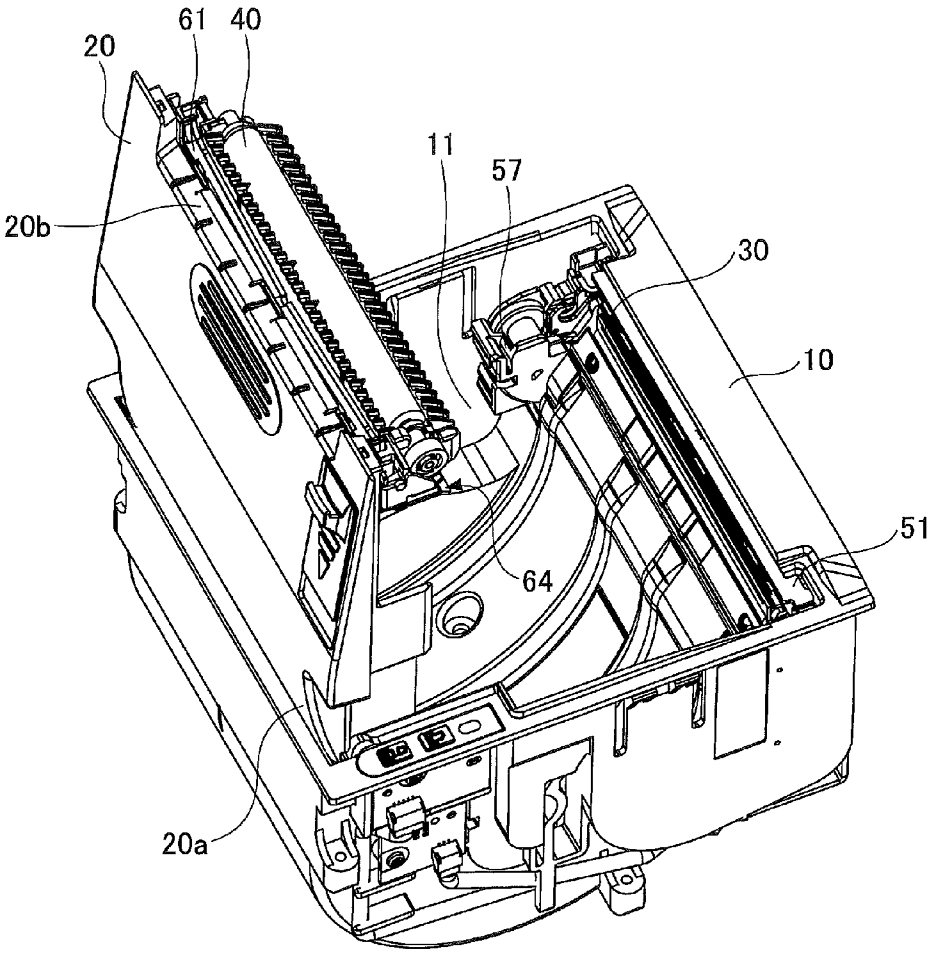
FIG. 1 is a perspective view of a printer with a lid opened according to an embodiment.

One or more embodiments of the present invention are described below with reference to the accompanying drawings. The same elements are referred to by the same reference numeral, and are not further described.

A printer according to an embodiment is described with reference to FIGS. 1 through 4.

Figure 2:
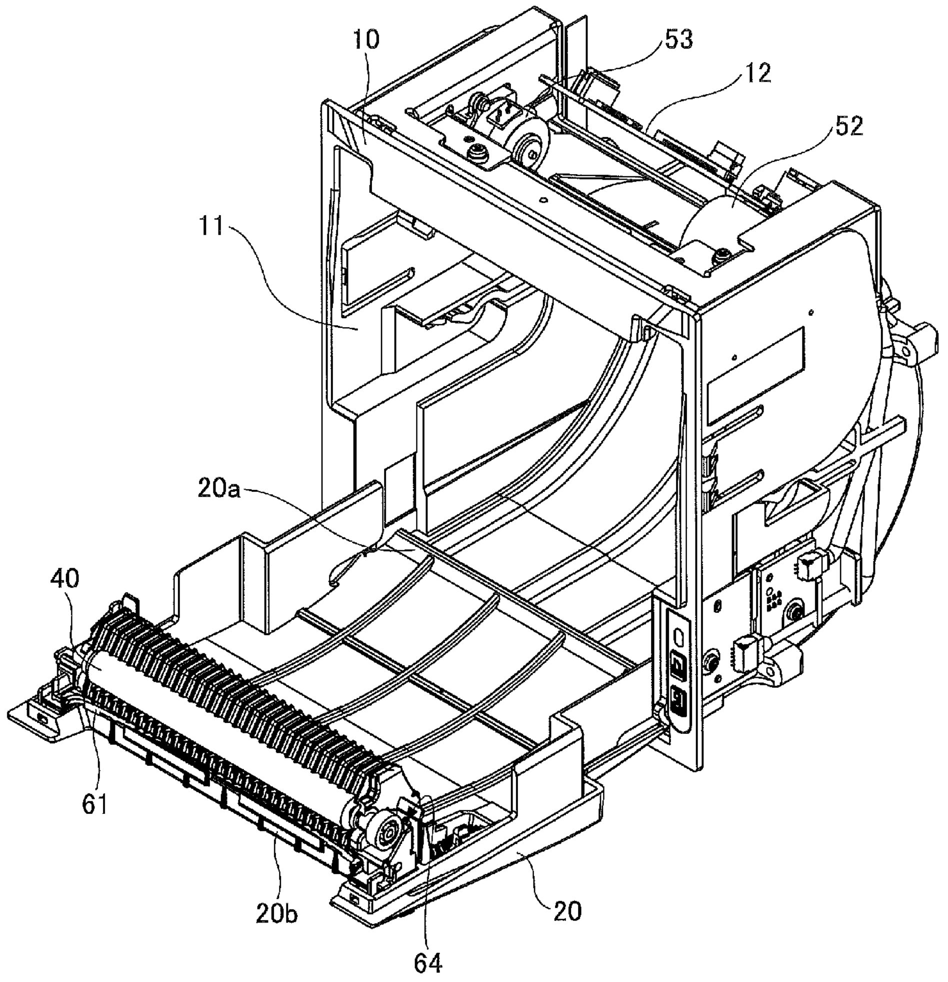
FIG. 2 is a perspective view of the printer with the lid opened according to the embodiment.
Figure 3:
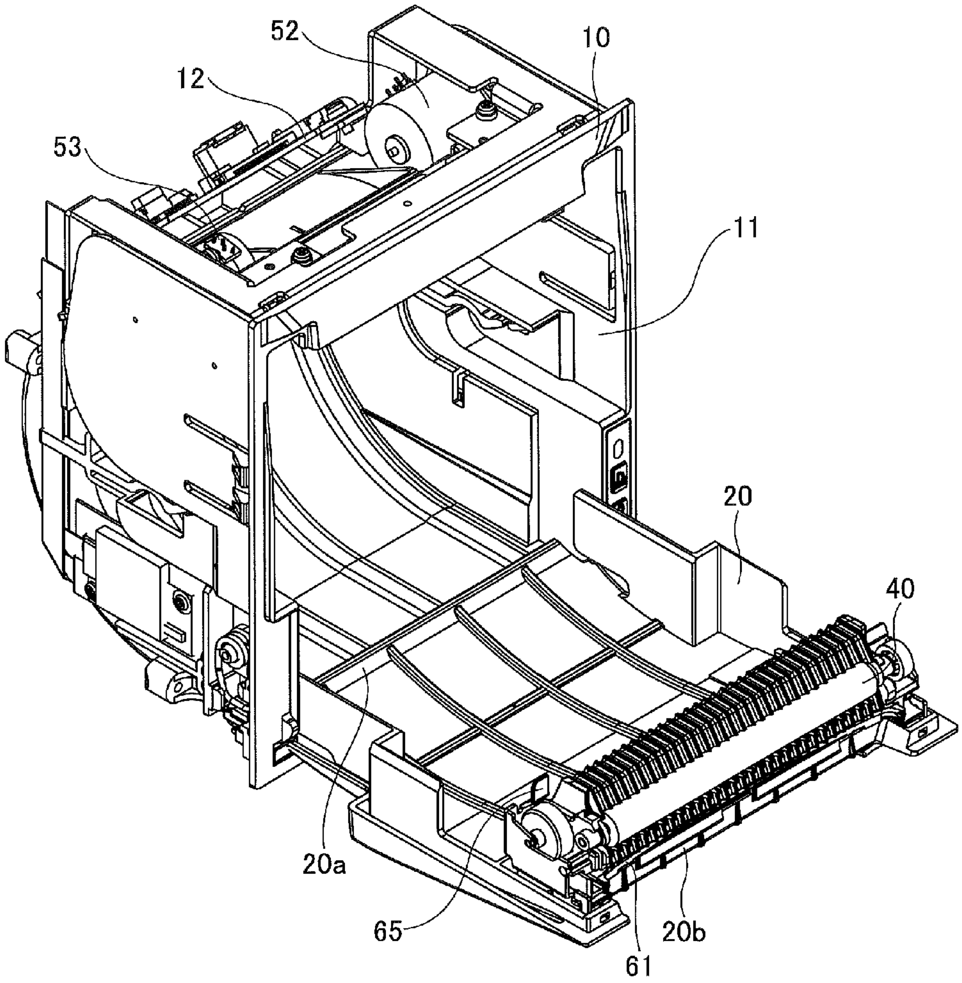
FIG. 3 is a perspective view of the printer with the lid opened according to the embodiment.
Figure 4:
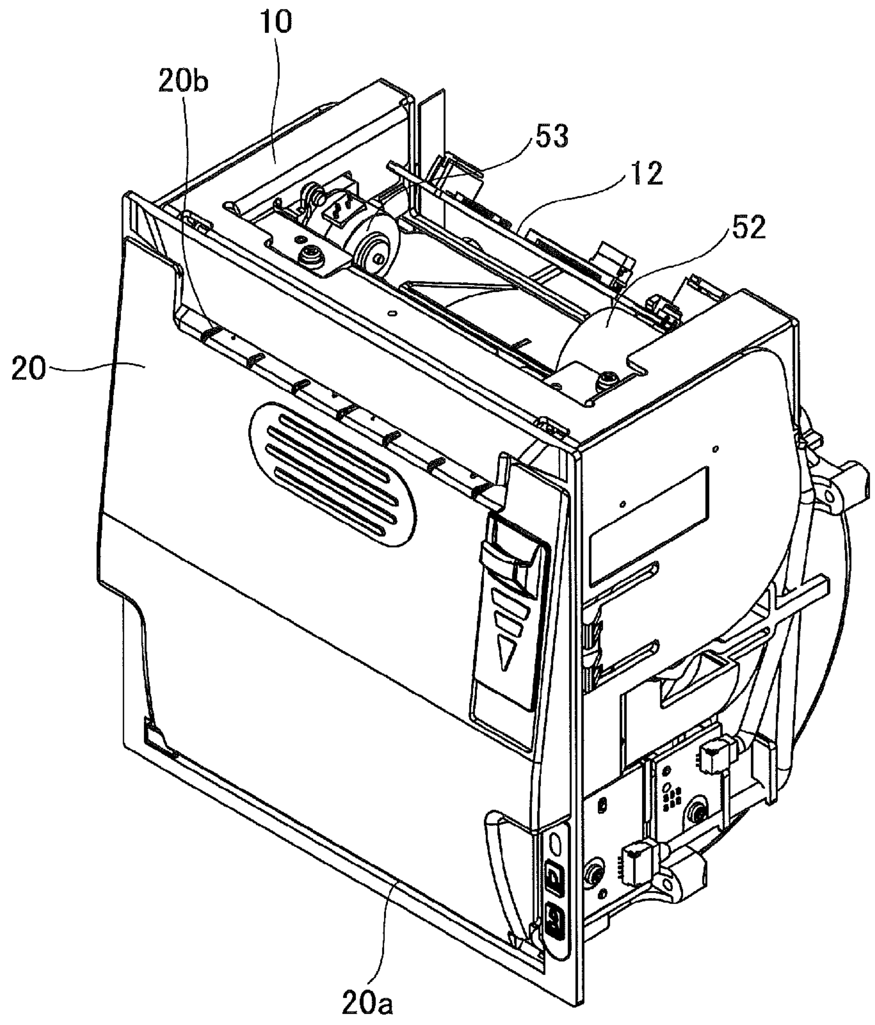
FIG. 4 is a perspective view of the printer with the lid closed according to the embodiment.

FIGS. 1 through 3 are perspective views of the printer with the lid opened, taken from different directions. FIG. 4 is a perspective view of the printer with the lid closed.

According to this embodiment, the printer is of a clamshell type, and includes a printer body 10 and a lid 20. The printer body 10 includes a recording paper holder 11 that defines a space for loading a roll of recording paper. A first end 20*a* of the lid 20 is connected to the printer body 10 in such a manner as to allow the lid 20 to be opened and closed relative to the printer body 10. That is, a rotation shaft 20*c* (illustrated in FIGS. 9 and 10) provided on part of the lid 20 near the first end 20*a* is connected to the printer body 10, and the lid 20 is opened and closed relative to the printer body 10 by rotating the lid 20 about the rotation shaft 20*c*.

According to this embodiment, at the time of using the printer, a roll of recording paper is placed inside the recording paper holder 11 of the printer body 10, and the lid 20 is closed as illustrated in FIG. 4. As a result, printing is ready to be performed on the recording paper in the printer.

The printer includes a thermal head 30 provided in the printer body 10. The thermal head 30 operates as a print head. The printer includes a platen roller 40 provided on the lid 20. The printer also includes a fixed blade 51 provided in the printer body 10 and a movable blade 61 provided on the lid 20. The printer further includes a conveyance motor 52 for rotating the platen roller 40 to convey the recording paper, and a movable blade motor 53 for driving the movable blade 61. The conveyance motor 52 and the movable blade motor 53 are provided in the printer body 10. The platen roller 40 and the movable blade 61 are provided near a second end 20*b* of the lid 20.

According to the printer, by closing the lid 20, the recording paper is held between the thermal head 30 and the platen roller 40, and is held between the fixed blade 51 and the movable blade 61. Thus, by closing the lid 20, the fixed blade 51 and the movable blade 61 are placed at predetermined positions to form a cutter, so that printing and cutting are ready to be performed on the recording paper. The printer further includes a control board 12 provided outside the printer body 10. The control board 12 is for controlling the printer.

Figure 5A:
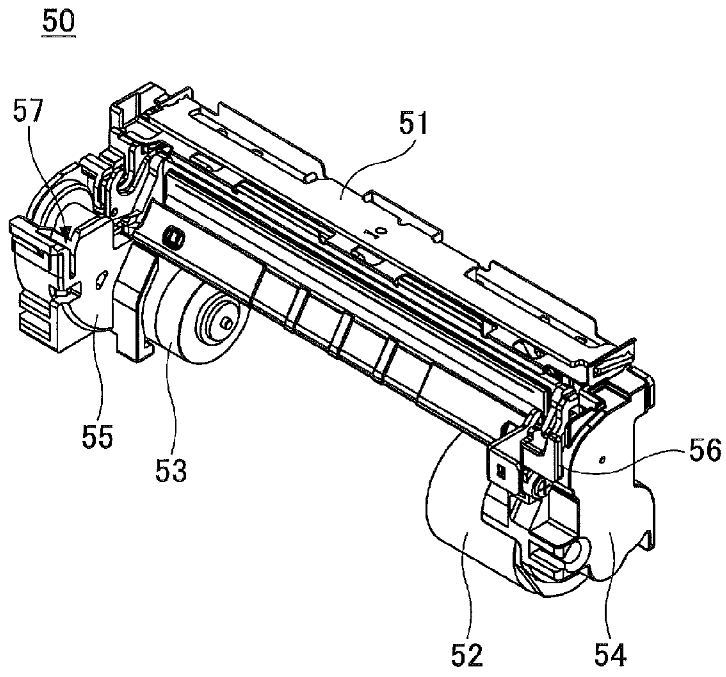
FIGS. 5A and 5B are diagrams illustrating a fixed blade unit of the printer according to the embodiment.
Figure 5B:
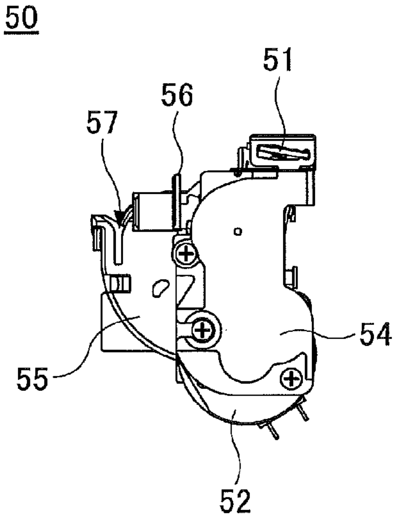

The printer includes a fixed blade unit 50 provided in the printer body 10. The fixed blade unit 50 includes the fixed blade 51. FIG. 5A is a perspective view of the fixed blade unit 50. FIG. 5B is a side view of the fixed blade unit 50. The fixed blade unit 50 includes the fixed blade 51, the conveyance motor 52, the movable blade motor 53, a conveyance gear box 54, and a movable blade gear box 55. The conveyance gear box 54 covers multiple conveyance gears provided inside the conveyance gear box 54. The movable blade gear box 55 covers multiple movable blade gears provided inside the movable blade gear box 55.

The platen roller 40 is rotated via the conveyance gears inside the conveyance gear box 54 by rotating the conveyance motor 52. The movable blade 61 is slid via the movable blade gears inside the movable blade gear box 55 by rotating the movable blade motor 53.

The conveyance gear box 54 and the movable blade gear box 55 are die castings made of zinc. The conveyance gear box 54 and the movable blade gear box 55 are positioned at a first longitudinal end and a second longitudinal end of the fixed blade unit 50, respectively.

Figure 6A:
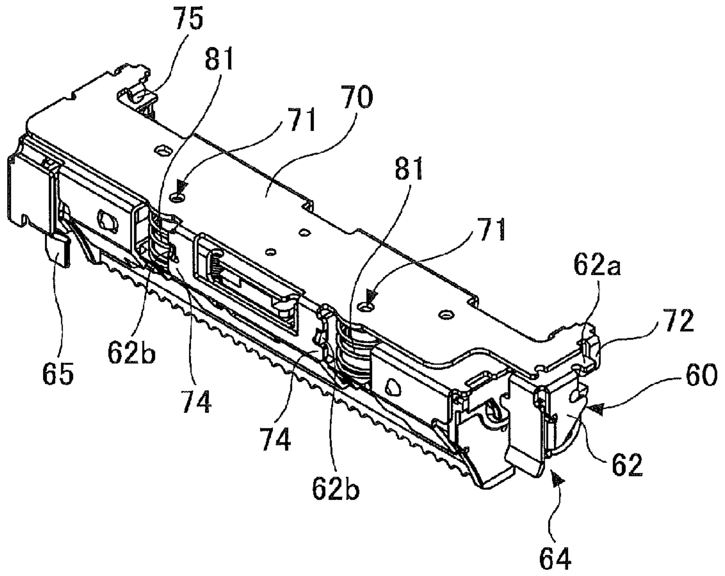
FIGS. 6A and 6B are diagrams illustrating a movable blade unit of the printer according to the embodiment.
Figure 6B:
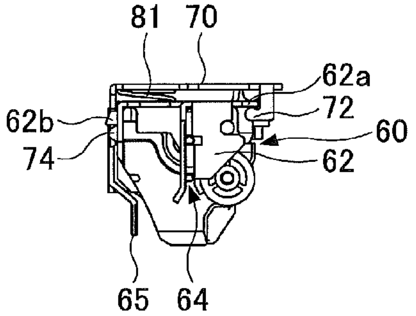
Figure 7:
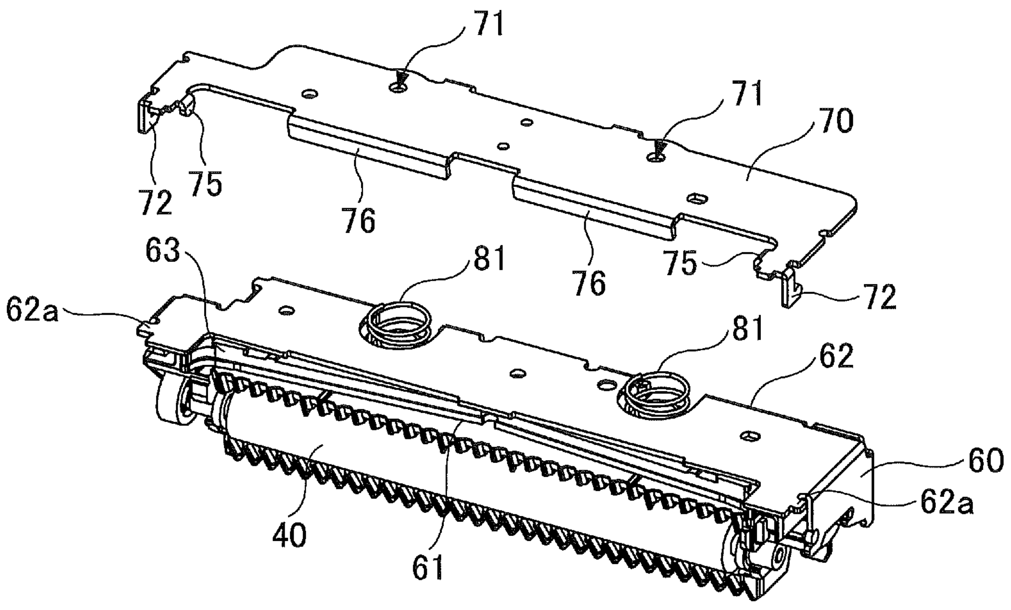
FIG. 7 is a diagram illustrating the movable blade unit of the printer according to the embodiment.

Furthermore, the printer includes a movable blade unit 60 as illustrated in FIGS. 6A, 6B and 7 provided near the second end 20*b* of the lid 20. The movable blade unit 60 includes the movable blade 61. FIG. 6A is a perspective view of the movable blade unit 60. FIG. 6B is a side view of the movable blade unit 60. FIG. 7 is a perspective view of the movable blade unit 60 with the platen roller 40 attached to and a gimbal plate 70 removed from the movable blade unit 60.

The movable blade unit 60 includes a movable blade unit housing 62. The movable blade unit housing 62 in its entirety is formed by bending a metal plate of stainless steel or the like. The movable blade 61 is provided inside the movable blade unit housing 62. The gimbal plate 70 is connected to the movable blade unit 60 on the side on which the movable blade unit 60 is attached to the lid 20. Two coil springs 81 are provided so as to intervene between the gimbal plate 70 and the movable blade unit 60. According to this embodiment, a screw is inserted through each of two attachment holes 71 formed in the gimbal plate 70, and the gimbal plate 70 is screwed to the lid 20 with the screws, so that the movable blade unit 60 is attached to the lid 20. Each attachment hole 71 is provided so as to align with the axial center of the corresponding coil spring 81.

The movable blade unit 60 is described in more detail with reference to FIG. 7. The gimbal plate 70 is formed by processing a metal plate of stainless steel or the like. The movable blade unit 60 includes a rack 63, and the movable blade 61 is attached to the rack 63. The movable blade 61 is slid together with the rack 63 via the movable blade gears in the movable blade gear box 55 by rotating the movable blade motor 53 in the fixed blade unit 50.

Figure 8A:
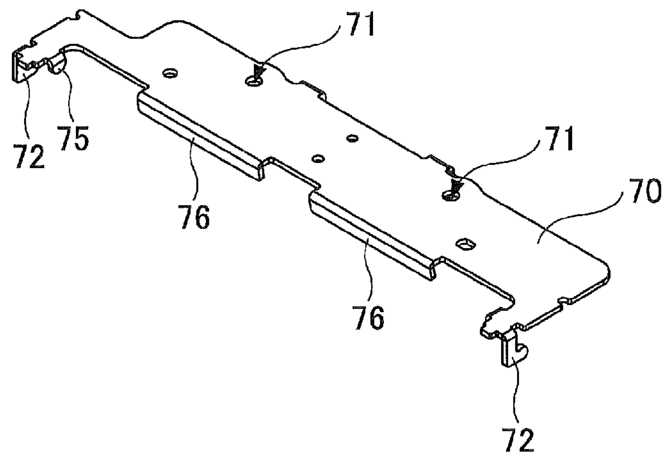
FIGS. 8A and 8B are diagrams illustrating a gimbal plate.
Figure 8B:
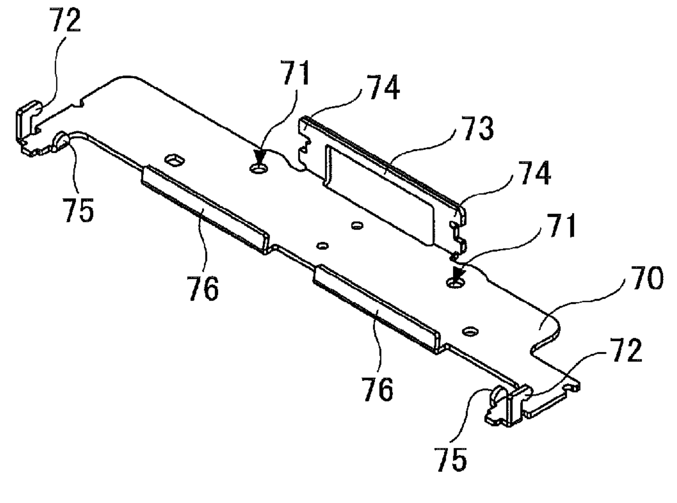

Next, the gimbal plate 70 is described in more detail with reference to FIGS. 8A and 8B. FIG. 8A is a top-side perspective view of the gimbal plate 70. FIG. 8B is a bottom-side perspective view of the gimbal plate 70. The gimbal plate 70 includes L-shaped first hooks 72 one at each longitudinal end of the gimbal plate 70. The gimbal plate 70 includes a connection bent part 73 projecting downward from a central portion of a first side edge of the gimbal plate 70 extending in a longitudinal direction of the gimbal plate 70. The connection bent part 73 is elongated in a longitudinal direction of the gimbal plate 70, and includes second hooks 74 one at each longitudinal end of the connection bent part 73. Thus, the gimbal plate 70 includes the first hooks 72 provided at two points and also the second hooks 74 provided at two points.

The first hooks 72 and the second hooks 74 are provided on opposite sides of the gimbal plate 70, so that the first hooks 72 are closer to and the second hooks 74 are farther from the fixed blade 51 when the gimbal plate 70 is connected to the movable blade unit 60 and provided on the lid 20. The gimbal plate 70 is formed by bending a metal plate, so that an L-shaped surface of each first hook 72 is in a plane perpendicular to a longitudinal direction of the connection bent part 73.

At the time of connecting the gimbal plate 70 to the movable blade unit 60, first, the first hooks 72 of the gimbal plate 70 are caught on first projections 62*a* one formed at each longitudinal end of the movable blade unit housing 62 as illustrated in FIGS. 6A and 7. Thereafter, the second hooks 74 are caught on second projections 62*b* of the movable blade unit housing 62. As a result, the gimbal plate 70 is connected to the movable blade unit 60. At this point, the coil springs 81 intervening between the gimbal plate 70 and the movable blade unit 60 urge the gimbal plate 70 in a direction away from the movable blade unit 60. The gimbal plate 70 is connected to the movable blade unit 60 by engaging the first hooks 72 with the first projections 62*a* and engaging the second hooks 74 with the second projections 62*b* against the resilience of the coil springs 81.

The coil springs 81 are provided so that the positions of the attachment holes 71 used for attaching the gimbal plate 70 to the lid 20 align with the internal spaces of the coil springs 81. By thus providing the coil springs 81 so that the internal spaces of the coil springs 81 align with the positions of the attachment holes 71, it is possible to ensure a workspace for fixing the gimbal plate 70 to the lid 20 with screws. In other words, the misalignment of the internal spaces of the coil springs 81 and the positions of the attachment holes 71 would increase the size of the printer. According to this embodiment, however, the internal spaces of the coil springs 81 and the positions of the attachment holes 71 are aligned. Accordingly, it is possible to make effective use of dead spaces in the internal spaces of the coil springs 81 as a workspace for attaching the gimbal plate 70 to the lid 20 with screws, so that the printer is reduced in size.

Furthermore, recording paper side guides 75 and recording paper face guides 76 that come into contact with and guide recording paper are provided on the side of the gimbal plate 70 closer to the fixed blade 51. The recording paper side guides 75 guide the side edges of the recording paper, and are provided one near each longitudinal end of the gimbal plate 70. That is, the recording paper side guides 75 are provided at two points. The recording paper face guides 76 guide the paper face of the recording paper. The recording paper face guides 76 are provided at two points on a second side edge of the gimbal plate 70 opposite to the first side edge so as to project downward to come into contact with the recording paper.

Figure 9:
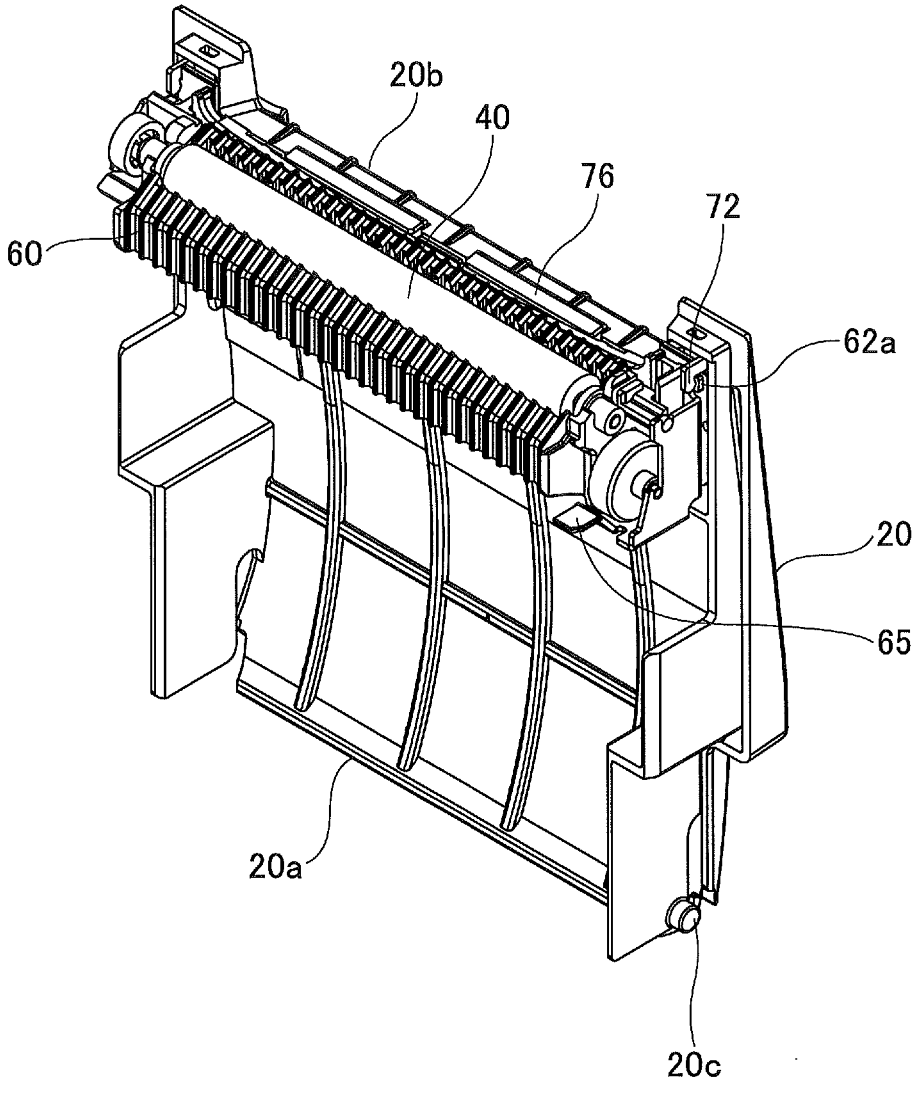
FIG. 9 is a perspective view of the lid on which the movable blade unit is provided.
Figure 10:
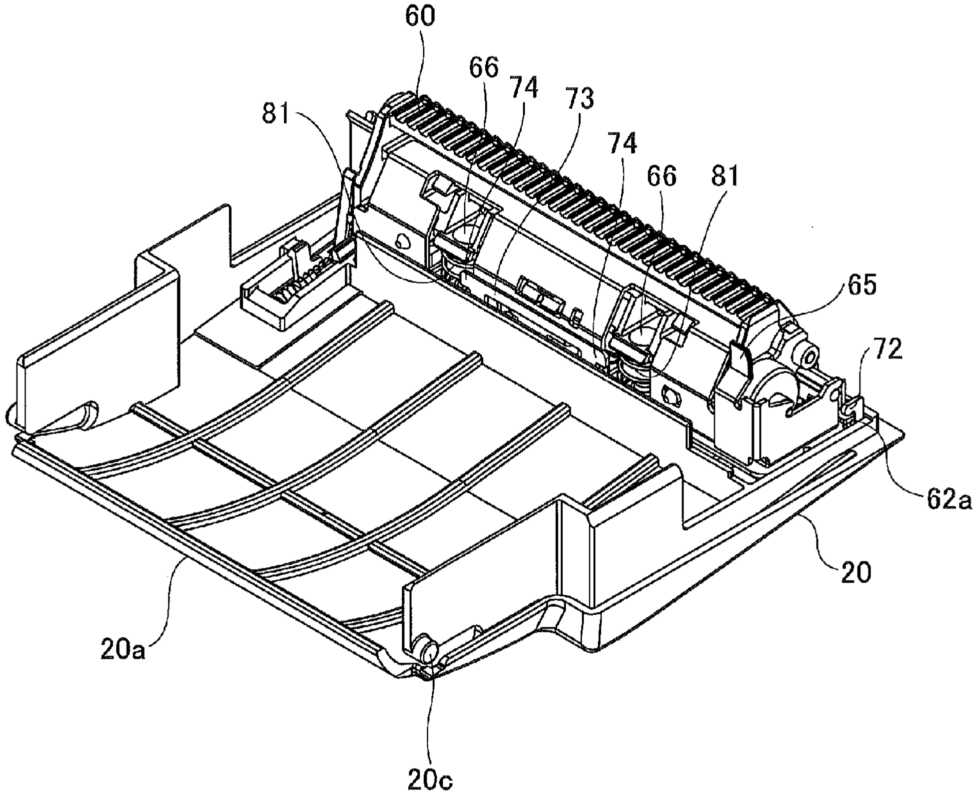
FIG. 10 is a perspective view of the lid on which the movable blade unit is provided.
Figure 11:
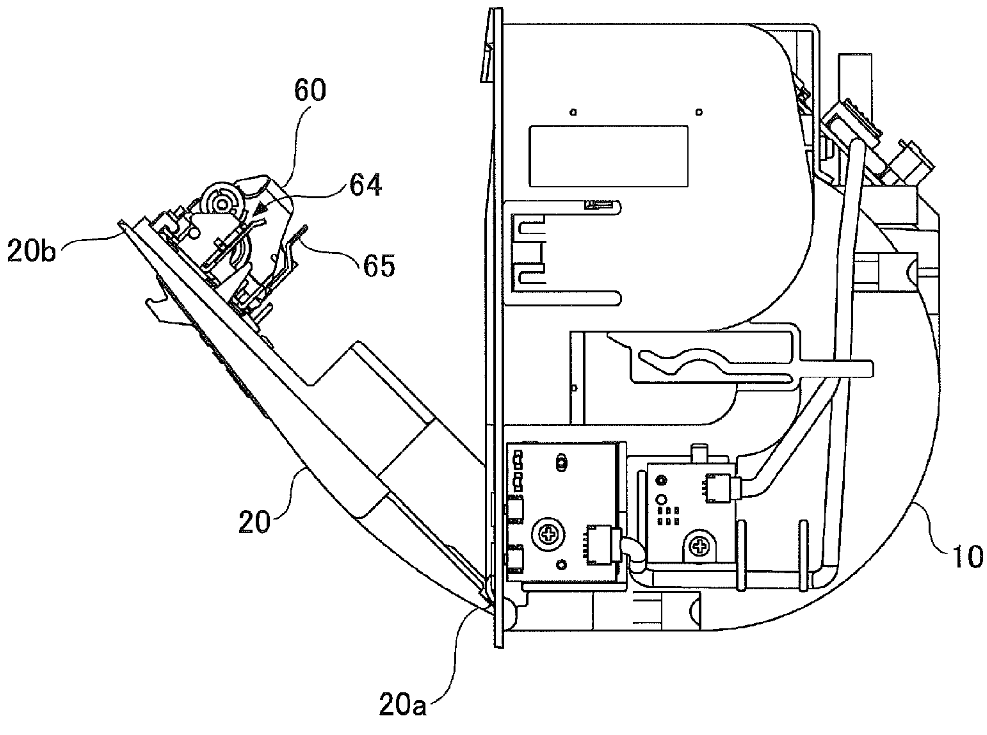
FIG. 11 is a side view of the printer with the lid opened according to the embodiment.
Figure 12:
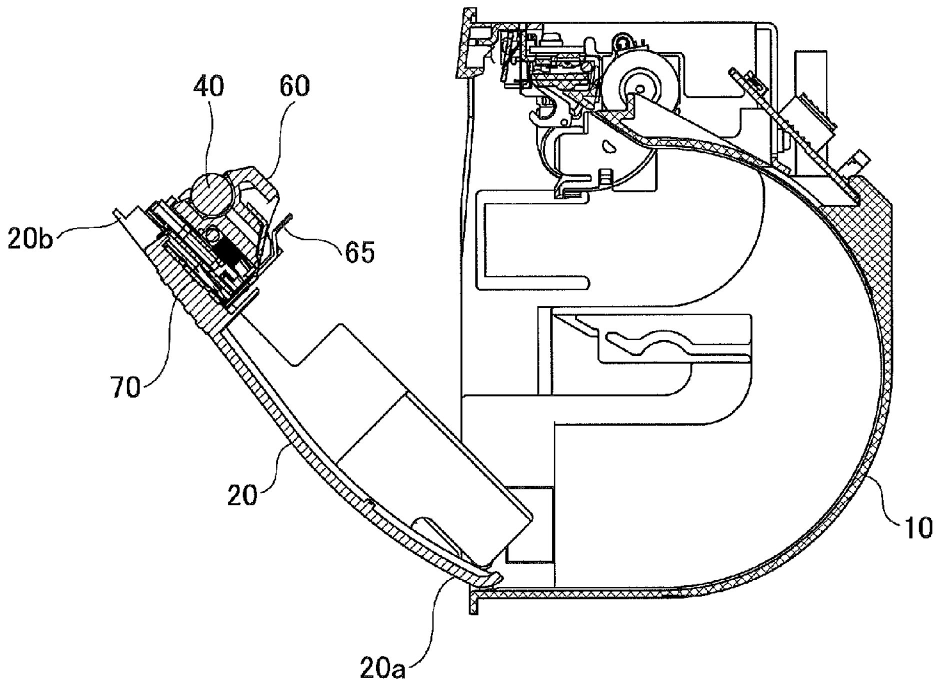
FIG. 12 is a cross-sectional view of the printer with the lid opened according to the embodiment.

Next, the placement of the movable blade unit 60 on the lid 20 is described with reference to FIGS. 9 through 12. FIGS. 9 and 10 are perspective views of the lid 20 removed from the printer body 10, taken from different directions. FIG. 11 is a side view of the printer with the lid 20 opened approximately 45°. FIG. 12 is a cross-sectional view of the printer with the lid 20 opened approximately 45°. As illustrated in FIGS. 9 and 10, the rotation shaft 20*c* is formed near the first end 20*a* of the lid 20, and the lid 20 is rotatably connected to the printer body 10 via the rotation shaft 20*c*.

The movable blade unit 60 is provided on the lid 20 via the gimbal plate 70 near the second end 20*b* of the lid 20. As illustrated in, for example, FIG. 10, in the movable blade unit 60, tubular cylindrical parts 66 are formed where the coil springs 81 are provided. The coil springs 81 are provided around the cylindrical parts 66 (on the lid 20 side). The cylindrical parts 66 are formed so that the internal spaces of the cylindrical parts 66 align with the positions of the attachment holes 71 of the gimbal plate 70. As a result, it is possible to attach the gimbal plate 70 to the lid 20 by inserting screws through the attachment holes 71 of the gimbal plate 70. Accordingly, it is possible to use dead spaces in the internal spaces of the cylindrical parts 66 as a workspace for attaching the gimbal plate 70 to the lid 20, so that the printer is reduced in size.

Figure 13A:
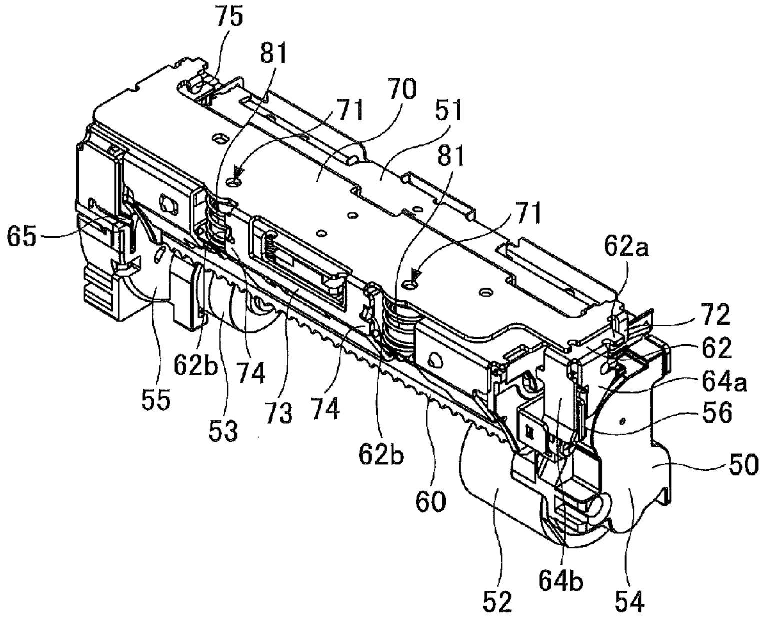
FIGS. 13A and 13B are diagrams illustrating the fixed blade unit and the movable blade unit of the printer in a connected state according to the embodiment.
Figure 13B:
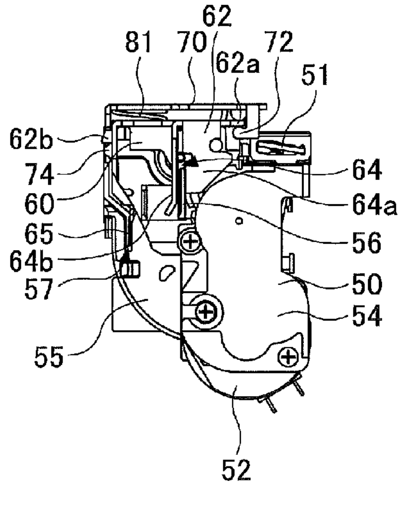

The fixed blade 51 and the movable blade 61 form a cutter. By closing the lid 20, the fixed blade unit 50 illustrated in FIGS. 5A and 5B and the movable blade unit 60 illustrated in FIGS. 6A and 6B are connected as illustrated in FIGS. 13A and 13B. FIGS. 13A and 13B are a perspective view and a side view, respectively, of the fixed blade unit 50 and the movable blade unit 60 with the lid 20 closed in the printer.

As illustrated in, for example, FIGS. 5A, 5B, 6A, 6B, 13A and 13B, the fixed blade unit 50 includes a first projection 56 provided near the conveyance gear box 54. Like the conveyance gear box 54, the first projection 56 is formed of zinc by die casting. The movable blade unit 60 includes a first groove 64 provided at a position corresponding to the first projection 56, so that the first projection 56 enters the first groove 64 when the lid 20 is closed. The first groove 64 is formed by bending parts of a metal plate that forms the movable unit housing 62. As illustrated in FIG. 13A, the first groove 64 is formed by a gap between a first bent part 64*a*, formed by bending part of the metal plate, and a second bent part 64*b*, formed by bending another part of the metal plate. The gap of the first groove 64 is wide at the entrance so as to facilitate entry of the first projection 56. The gap of the first groove 64 gradually decreases in width toward the bottom.

Furthermore, the movable blade unit 60 includes a second projection 65 that is formed by bending part of a metal plate that forms the movable blade unit housing 62. The fixed blade unit 50 includes a second groove 57 provided at a position corresponding to the second projection 65, so that the second projection 65 enters the second groove 57 when the lid 20 is closed. The second groove 57 is formed in part of the movable blade gear box 55, and is made of zinc by die casting. The gap of the second groove 57 is wide at the entrance so as to facilitate entry of the second projection 65. The gap of the second groove 57 gradually decreases in width toward the bottom.

That is, the first projection 56 is formed near the conveyance gear box 54 positioned at the first longitudinal end of the fixed blade unit 50, and the second groove 57 is formed in part of the movable blade gear box 55 positioned at the second longitudinal end of the fixed blade unit 50. Correspondingly, the first groove 64 is formed on a first side surface of the movable blade unit 60 and the second projection 65 is formed near a second side surface of the movable blade unit 60.

According to this embodiment, by closing the lid 20, first, the first projection 56 provided near the first longitudinal end of the fixed blade unit 50 enters the first groove 64 formed on the first side surface of the movable blade unit 60. Thereafter, the second projection 65 formed near the second side surface of the movable blade unit 60 enters the second groove 57 provided at the second longitudinal end of the fixed blade unit 50.

Figure 14:
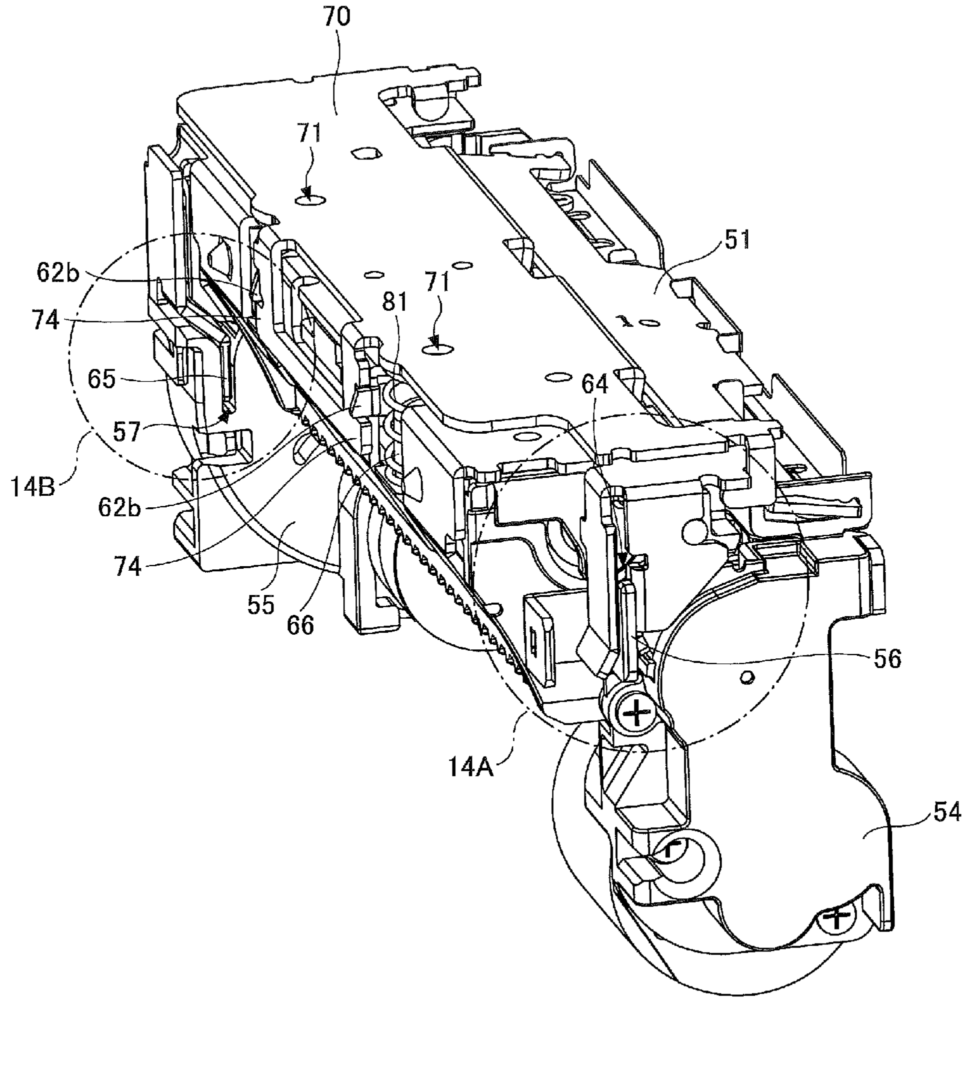
FIG. 14 is a diagram illustrating the fixed blade unit and the movable blade unit of the printer in the connected state according to the embodiment.
Figure 15A:
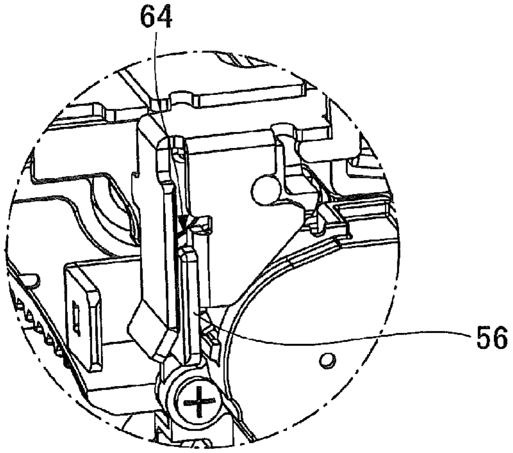
FIGS. 15A and 15B are diagrams illustrating the fixed blade unit and the movable blade unit of the printer in the connected state according to the embodiment.
Figure 15B:
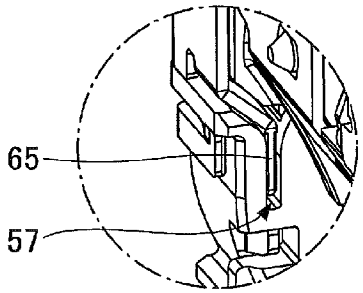

Accordingly, as illustrated in FIGS. 14, 15A and 15B, when the lid 20 is closed, the first projection 56 provided at the first longitudinal end of the fixed blade unit 50 is inside the first groove 64 formed on the first side surface of the movable blade unit 60. Furthermore, the second projection 65 formed near the second side surface of the movable blade unit 60 is inside the second groove 57 provided at the second longitudinal end of the fixed blade unit 50. FIG. 14 is a perspective view of the fixed blade unit 50 and the movable blade unit 60 in a state where the lid 20 is closed. FIG. 15A is a perspective view of an area encircled by a one-dot chain line 14A in FIG. 14. FIG. 15B is a perspective view of an area encircled by a one-dot chain line 14B in FIG. 14.

According to this embodiment, the first projection 56 and the second groove 57 are formed at the first longitudinal end and the second longitudinal end of the fixed blade unit 50, respectively. Furthermore, the first groove 64 and the second projection 65 are formed on the first surface and near the second surface of the movable blade unit 60, respectively. As a result, by closing the lid 20, the first projection 56 enters the first groove 64, and the second projection 65 enters the second groove 57, so that the lid 20 is closed at a predetermined position. Accordingly, because the lid 20 is closed so that the fixed blade 51 and the movable blade 61 are at predetermined positions, it is possible to prevent the fixed blade 51 and the movable blade 61 from hitting each other.

Furthermore, the first projection 56 is formed near the conveyance gear box 54 provided at the first longitudinal end of the fixed blade unit 50, and the second groove 57 is formed in the movable blade gear box 55 provided at the second longitudinal end of the fixed blade unit 50. That is, the first projection 56 is formed by processing part of the fixed blade unit 50 near the conveyance gear box 54 formed of zinc by die casting, and the second groove 57 is formed in the movable blade gear box 55.

Therefore, according to the printer of this embodiment, there is no need to provide particular spaces for forming the first projection 56 and the second groove 57. That is, according to the printer of this embodiment, it is possible to form the first projection 56 and the second groove 57 without providing particular spaces. Accordingly, it is possible to prevent the printer from increasing in size and to reduce the size of the printer.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. A printer, comprising:

a printer body including a print head;

a lid connected to the printer body so as to be opened and closed relative to the printer body;

a cutter including a fixed blade and a movable blade that cuts recording paper;

a fixed blade unit provided in the printer body, the fixed blade unit including the fixed blade;

a movable blade unit provided on the lid, the movable blade unit including the movable blade;

a gimbal plate attached to the lid and to which the movable blade unit is connected; and a spring intervening between the movable blade unit and the gimbal plate, wherein the spring urges the gimbal plate in a direction away from the movable blade unit, and wherein the movable blade unit is provided on the lid with the gimbal plate attached to the lid.

2. The printer as claimed in claim 1, wherein the spring is a coil spring, the gimbal plate includes an attachment hole for attaching the gimbal plate to the lid, and the attachment hole aligns with an area inside the coil spring.

3. The printer as claimed in claim 2, wherein the gimbal plate is connected to the lid with a screw at the attachment hole.

4. The printer as claimed in claim 1, wherein the movable blade unit includes a housing in which the movable blade is provided, the housing includes a first engaging part and a second engaging part formed on a first side and a second side of the housing, respectively, the gimbal plate includes a first hook corresponding to the first engaging part and a second hook corresponding to the second engaging part, and the movable blade unit and the gimbal plate are connected with the first hook and the second hook engaging with the first engaging part and the second engaging part, respectively.

5. The printer as claimed in claim 1, wherein the fixed blade unit further includes a conveyance motor, a movable blade motor, a conveyance gear box, and a movable blade gear box, a platen roller is provided on the movable blade unit, the platen roller is rotated by the conveyance motor via gears in the conveyance gear box, and the movable blade is driven by the movable blade motor via gears in the movable blade gear box.

* * * * *